United States Patent
Ogawa et al.

(10) Patent No.: US 6,738,613 B1
(45) Date of Patent: May 18, 2004

(54) TELEPHONE SET HAVING AUTOMATIC INCOMING-CALL ACKNOWLEDGEMENT DETECTION

(75) Inventors: Nobuyuki Ogawa, Kanagawa (JP); Takeshi Sakoh, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/295,205

(22) Filed: Apr. 20, 1999

(30) Foreign Application Priority Data

May 8, 1998 (JP) .......................................... 10-140388

(51) Int. Cl.⁷ ............................................. H04M 11/00
(52) U.S. Cl. ..................... 455/414.1; 455/460; 455/567
(58) Field of Search .................. 455/460, 462, 455/463, 564, 566, 567, 414.1, 458, 412, 413, 461; 379/209, 354, 355, 356, 387, 216, 459, 210.01, 215.01, 142.01, 209.01, 100.06

(56) References Cited

U.S. PATENT DOCUMENTS

| | | | | |
|---|---|---|---|---|
| 4,052,570 A | * | 10/1977 | Sutton ........................ | 379/357 |
| 4,172,969 A | * | 10/1979 | Levine et al. ................ | 379/70 |
| 4,209,668 A | * | 6/1980 | Weinberger et al. ........ | 379/188 |
| 4,726,059 A | * | 2/1988 | Havel ......................... | 379/354 |
| 4,985,912 A | * | 1/1991 | Ono ............................ | 455/566 |
| 5,206,900 A | * | 4/1993 | Callele ........................ | 379/142 |
| 5,224,146 A | * | 6/1993 | Tanaka et al. .............. | 455/462 |
| 5,233,641 A | * | 8/1993 | Maeda ........................ | 455/567 |
| 5,243,646 A | | 9/1993 | McCarthy | |
| 5,287,551 A | * | 2/1994 | Gustafson, Jr. et al. ..... | 455/509 |
| 5,327,578 A | * | 7/1994 | Breeden et al. ............. | 455/434 |
| 5,406,616 A | * | 4/1995 | Bjorndahl ................... | 380/46 |
| 5,416,828 A | * | 5/1995 | Hiramatsu et al. .......... | 455/557 |
| 5,644,624 A | * | 7/1997 | Caldwell .................... | 379/69 |
| 5,668,861 A | * | 9/1997 | Watts ......................... | 379/215.01 |
| 5,703,930 A | * | 12/1997 | Miska et al. ................ | 455/410 |
| 5,758,280 A | * | 5/1998 | Kimura ...................... | 455/412 |
| 5,845,202 A | * | 12/1998 | Davis ......................... | 455/412 |
| 5,907,596 A | * | 5/1999 | Karnowski ................. | 379/88.21 |
| 5,946,636 A | * | 8/1999 | Uyeno et al. ............... | 455/566 |

(List continued on next page.)

FOREIGN PATENT DOCUMENTS

| | | | | |
|---|---|---|---|---|
| EP | 0 886 416 A1 | | 12/1998 | |
| GB | 2238208 | * | 5/1991 | ............ H04M/1/00 |
| GB | 2 317 784 A | | 9/1997 | |
| GB | 2333392 | * | 7/1999 | ............ G09G/3/34 |
| GB | 2 338 625 A | * | 12/1999 | ............ H04M/1/72 |
| JP | 402256358 | * | 10/1990 | |
| WO | 98/40996 | * | 9/1998 | ............ H04M/1/00 |

*Primary Examiner*—Charles Appiah
(74) *Attorney, Agent, or Firm*—Pearne & Gordon LLP

(57) ABSTRACT

In relation to telephone sets connected together over a radio channel, to enable a telephone set of a calling party to readily identify whether or not a call acknowledgement from a receiving party has been detected. After a call has been originated by way of a keyboard 22 of a radio telephone set, a call acknowledgement signal detection section 17c monitors a call acknowledgement signal transmitted from the calling party by way of a base station 30. When the call acknowledgement signal detection section 17c detects the call acknowledgement signal transmitted from the receiving party, a specific call acknowledgement sound signal is output from an audio output section 21. Further, a specific screen color is displayed on a display section 20. If no call acknowledgement signal from the receiving party is detected and the call acknowledgement detection section 17c determines that no call acknowledgement from the receiving party has been detected, a call is automatically re-originated by means of an automatic call originating function, thereby enabling easy identification of a call acknowledgement. Further, since the call is automatically re-originated if no call acknowledgement from the receiving party is detected, the operations required for the calling party are simplified.

21 Claims, 3 Drawing Sheets

U.S. PATENT DOCUMENTS

| | | | |
|---|---|---|---|
| 5,960,357 A | * 9/1999 | Kim | 455/462 |
| 5,974,117 A | * 10/1999 | Mahvi | 379/88.12 |
| 5,995,848 A | * 11/1999 | Nguyen | 455/414 |
| 6,009,157 A | * 12/1999 | Bales et al. | 379/209.01 |
| 6,081,725 A | * 6/2000 | Ishida | 455/462 |
| 6,154,644 A | * 11/2000 | Murray | 455/414 |
| 6,185,433 B1 | * 2/2001 | Lele et al. | 455/528 |
| 6,275,690 B1 | * 8/2001 | Higuchi et al. | 455/412 |
| 6,360,109 B1 | * 3/2002 | Thauvin et al. | 455/564 |
| 6,477,364 B1 | * 11/2002 | Otake | 455/414.1 |
| 6,477,383 B1 | * 11/2002 | Jyogataki et al. | 455/466 |

* cited by examiner

TELEPHONE SET HAVING AUTOMATIC INCOMING-CALL ACKNOWLEDGEMENT DETECTION

BACKGROUND OF THE INVENTION

The present invention relates to a telephone set automatic incoming-call acknowledgement detection, and more particularly, to a telephone set which enables a calling party to identify whether or not a receiving party has output a call acknowledgement.

FIG. 3 is a block diagram showing the configuration of a conventional telephone set. In FIG. 3, a base station 60 is a radio station for establishing connection among a plurality of telephone sets over a radio channel. A telephone set 50 is connected to the base station 60 over a radio channel and has an audio output section 48 for outputting a busy signal or a voice signal received from a receiving party, and a receiver section 45.

The operation of an existing telephone set will now be described. A call is made to or received from another telephone set by way of the base station 60 connected to the telephone set 50 over a radio channel. For example, the telephone set 50 connected to the base station 60 by way of a radio channel originates a call, and another telephone set connected to the telephone set 50 over the radio channel receives the call. At this time, the audio output section 48 and the receiver 45 of the telephone set 50 output a ring-back tone signal. If the telephone set of the receiving party outputs a call acknowledgement, an audio signal is output from the audio output section 48 and the receiver 45 of the telephone set of the calling party. If a telephone call is in progress in the telephone set of the receiving party or if the telephone set of the receiving party is unconnected, a busy tone signal is output from the audio output section 48 and the receiver 45 of the telephone set 50. The telephone set 50 cannot establish a call, and at a later time a call originating operation is performed again manually.

In a conventional telephone set, if the telephone set of the receiving party does not output a call acknowledgement, the calling party must perform a call originating operation once again at a alter time. Further, checking of a call acknowledgement from the receiving party requires the calling party to determine whether or not a call acknowledgement is received from the receiving party, by way of verbal communication.

SUMMARY OF THE INVENTION

The present invention solves such a problem in the conventional telephone set, and the object of the present invention is to provide a telephone set which relievers the calling party of the burden of having to repeatedly perform a call originating operation by readily and reliably reporting to the calling party whether or not the receiving party has output a call acknowledgement, by means of an audio output or a screen display on the telephone set of the calling party, and which enables immediate establishment of a call after the call acknowledgement from the receiving party has been checked. Therefore, the telephone set of the present invention has superior operability and convenience.

To achieve the foregoing object, the present invention provides a telephone set comprising: a transmit/receive section which sends a transmission signal and receives a signal from a base station; a call acknowledgement detection section for detecting a call acknowledgement signal output from the transmit/receive section; and means for displaying a call acknowledgement which enables the calling party to identify whether or not the receiving party has output a call acknowledgement.

The telephone set further comprises a transmit/receive section, a call acknowledgement detection section, an automatic call originating section which automatically originates a call after lapse of a specified period of time if no call acknowledgement from the receiving party is detected, and call acknowledgement display means.

A cordless telephone set comprises a transmit/receive section, a call acknowledgement detection section, an automatic call originating section which automatically originates a call after lapse of a specified period of time if no call acknowledgement from the receiving party is detected, and call acknowledgement display means.

The telephone set comprises audio output display means serving as call acknowledgement display means. When the call acknowledgement detection means detects a call acknowledgement signal output from the receiving party, a specific call acknowledgement sound signal is output. In contrast, if the call acknowledgement signal output from the receiving party is not detected, a sound signal different from the specific call acknowledgement sound signal is output.

In the telephone set, when the call acknowledgement detection section detects a call acknowledgement, the call acknowledgement is indicated in a specific screen color. In contrast, when the receiving party does not output a call acknowledgement, lack of a call acknowledgement from the receiving party is indicated in a screen color different from the specific screen color.

For example, in a case where a call is made from the telephone set of the calling party to the telephone set of the receiving party through specific operations, and where the telephone set of the receiving party does not output a call acknowledgement, the telephone set of the calling party reports to the calling party lack of a call acknowledgement from the receiving party by outputting a specific sound signal or by means of a screen display. The call originating operation is performed again by automatic call origination after lapse of a specific period of time. If a call acknowledgement from the receiving party is detected, the telephone set of the calling party reports to the calling party the call acknowledgement from the receiving party by outputting a specific sound signal or by way of a screen display.

With the foregoing configuration, the telephone set of the calling party enables checking as to whether or not the receiving party has output a call acknowledgement, by way of a specific signal output or a display. If no call acknowledgement from the receiving party is detected, a call originating operation can be performed again after lapse of a specific period of time through automatic call origination. As a result, the calling party is relieved of the burden of having to repeatedly perform call originating operations. Further, the calling party is notified of whether or not the calling party has output a call acknowledgement, by means of a specific sound signal output or a screen display. Thus, the calling party is readily and reliably informed of the call acknowledgement from the receiving party, thus enabling establishment of a call.

According to first aspect of the present invention, there is provided a telephone set equipped with automatic call acknowledgement detection means which is connected to a base station over a radio channel, the set comprising: a transmit/receive section for sending and receiving a signal to and from the base station; and a call acknowledgement detection section which identifies whether or not a receiving party has responded to the call by detection of a call acknowledgement signal from the receiving party. The telephone set identifies whether or not the receiving party has received the call by detection of a call acknowledgement signal from the calling party.

According to a second aspect of the present invention, the telephone set as defined in the first aspect, further comprises: an automatic call origination section which automatically re-originates the call after lapse of a predetermined period of time if the call acknowledgement detection section does not detect any call acknowledgement from the receiving party; and call acknowledgement display means which displays whether or not the call acknowledgement detection section has detected the call acknowledgement from the receiving party. The telephone set indicates whether or not a call acknowledgement signal from the receiving party has been detected. If no call acknowledgement signal from the receiving party is detected, the call is automatically made again.

According to a third aspect of the present invention, there is provided a telephone set which is equipped with automatic call acknowledgement detection means and includes a master telephone set housing a station circuit and a cordless telephone, wherein the cordless telephone comprises a transmit/receive section for sending and receiving a signal to and from the master telephone set; a call acknowledgement detection section for determining whether or not a receiving party has responded to the call, by detecting a call acknowledgement signal from the transmit/receive section; an automatic call origination section which automatically originates a call after lapse of a predetermined period of time if no call acknowledgement from the receiving party is detected; and call acknowledgement display means for displaying whether or not the call acknowledgement detection section has detected a call acknowledgement from the receiving party. The cordless telephone set detects a call acknowledgement and performs automatic re-origination of the call and indication of call acknowledgement.

According to a fourth aspect of the present invention, the telephone set as defined in the second or third aspect is further characterized by that the call acknowledgement display means comprises audio output means which outputs a predetermined call acknowledgement sound signal when the call acknowledgement detection means detects the call acknowledgement signal from the receiving party and which outputs a sound different from the predetermined call acknowledgement sound when the call acknowledgement signal is not detected. The telephone set reports to the caller the lack or receipt of a call acknowledgement using different call acknowledgement sound signals.

According to a fifth aspect of the present invention, the telephone set as defined in the second or third aspect is further characterized by that the call acknowledgement display means comprises screen display means which indicates a predetermined screen color when the call acknowledgement detection section detects the call acknowledgement signal and which indicates a screen color different from the predetermined screen color when no call acknowledgement signal from the receiving party is detected. The telephone set indicates lack or receipt of call acknowledgement using different screen colors.

DETAILED DESCRIPTION OF THE PREFERRED EMBODIMENTS

A preferred embodiment of the present invention will now be described in detail by reference to FIGS. 1 and 2.

The preferred embodiment of the present invention is directed to a telephone set equipped with automatic call acknowledgement detection means which identifies whether or not a receiving party has detected a call signal and has acknowledged receipt of the call signal, which automatically makes the call again after lapse of a predetermined period of time if no call acknowledgement from the receiving party is detected, and which reports to the calling party whether or not the call acknowledgement from the receiving party is detected, by means of a call acknowledgement sound signal or a screen color.

Figure 1:
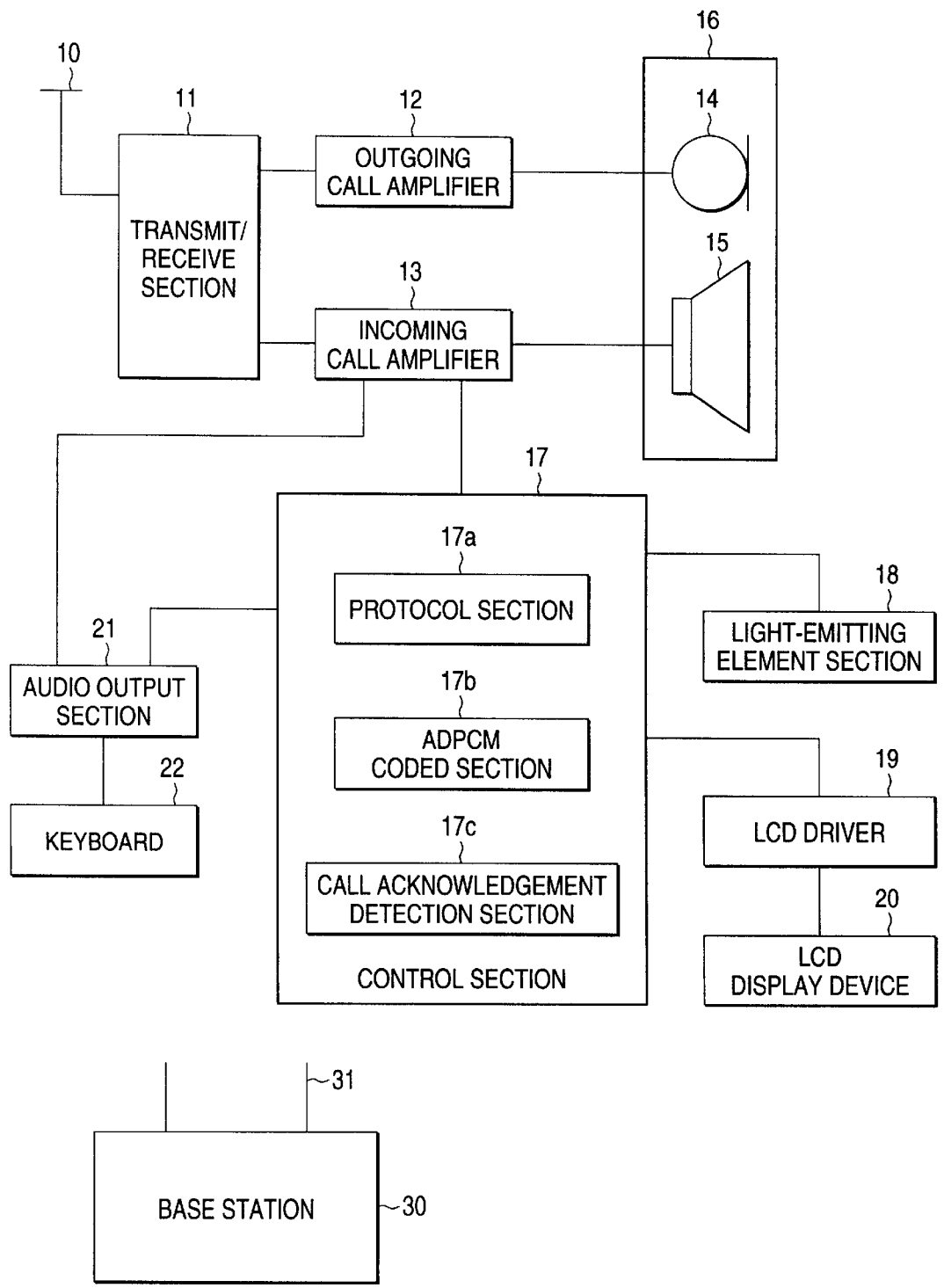
FIG. 1 is a block diagram showing the configuration of a telephone set according to an embodiment of the present invention.
Figure 2:
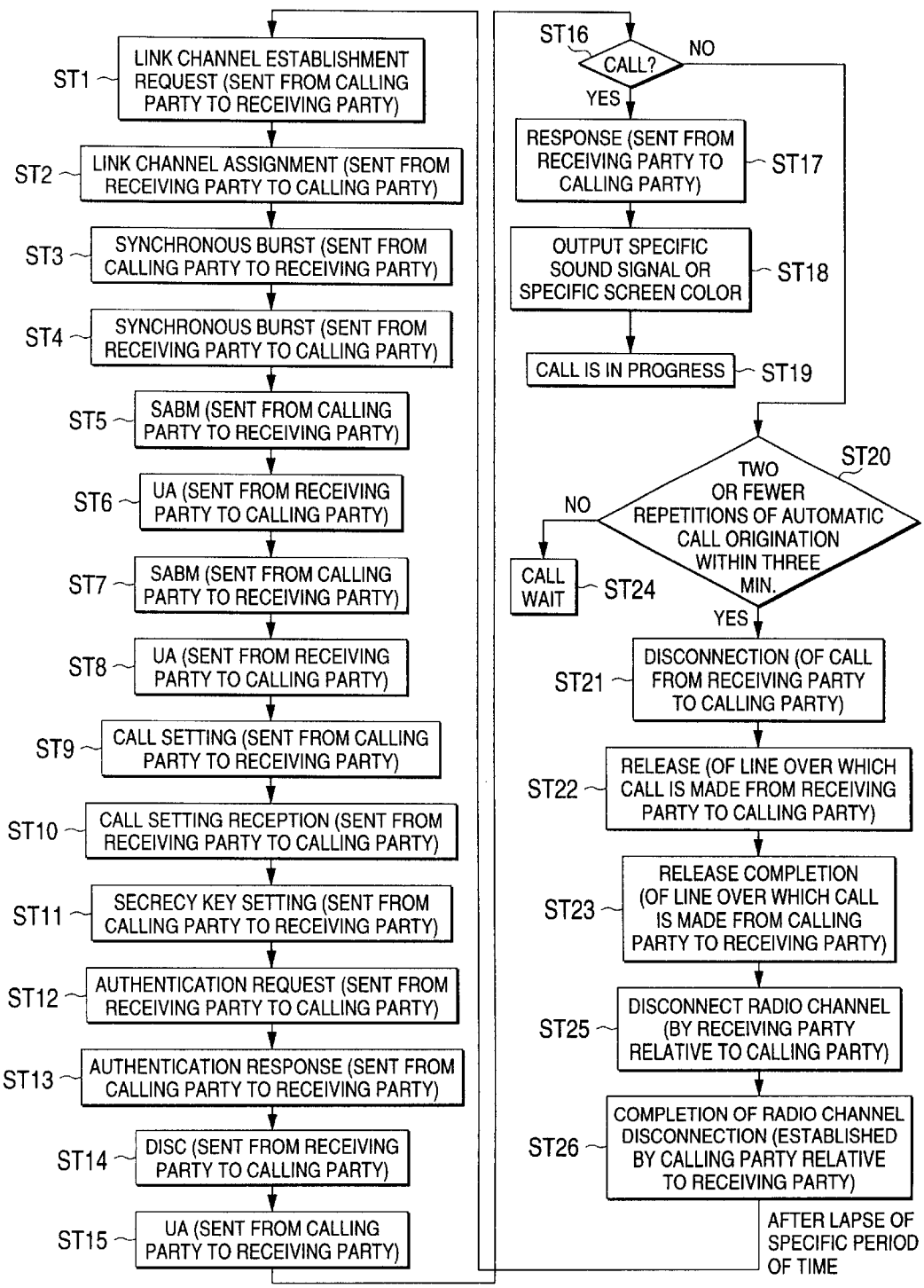
FIG. 2 is a flowchart showing the operation of the telephone set according to the embodiment.
Figure 3:
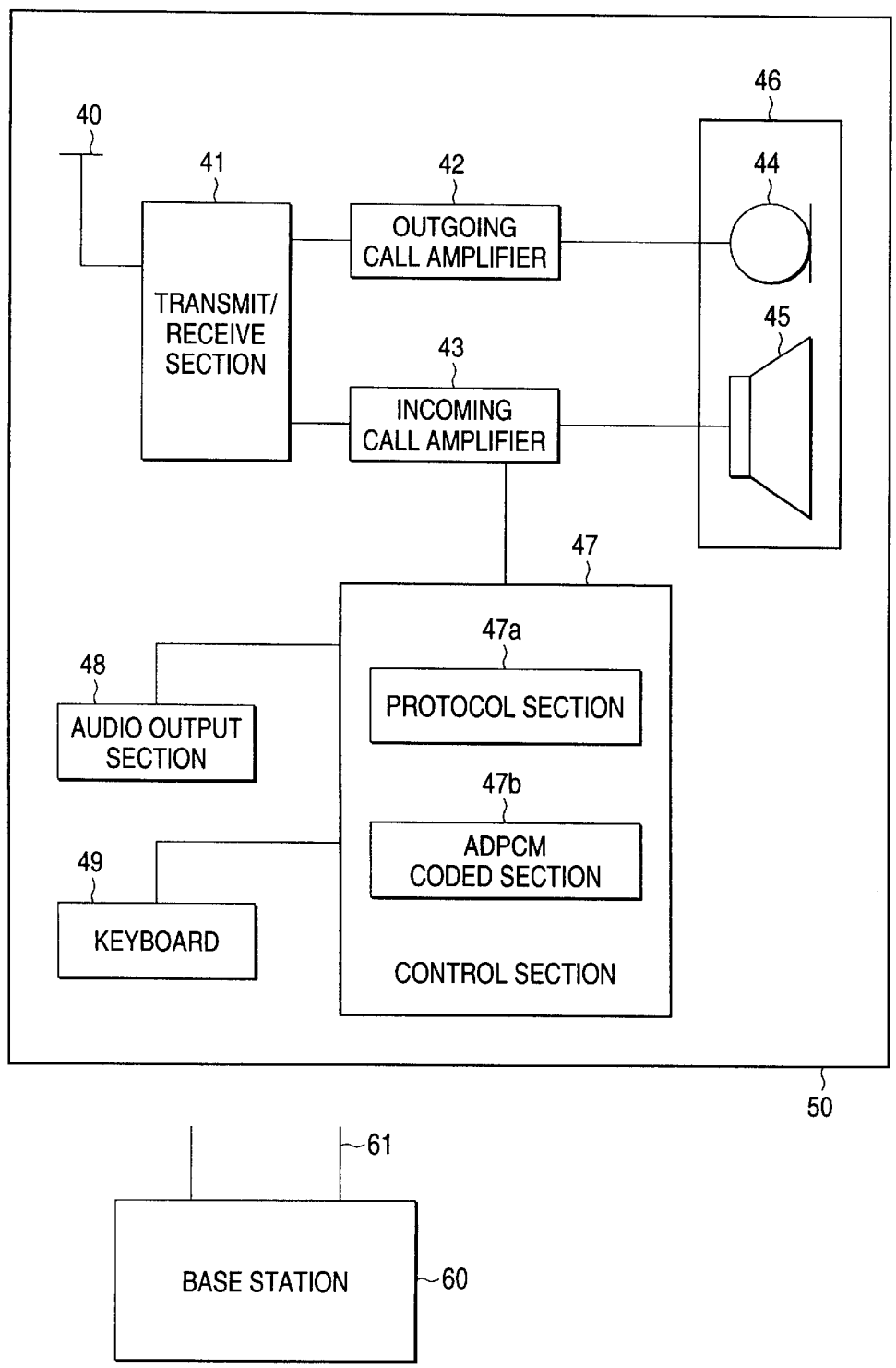
FIG. 3 is a block diagram showing the configuration of a conventional telephone set.

FIG. 1 is a block diagram showing the configuration of a telephone set according to a first embodiment of the present invention. In FIG. 1, an antenna 10 is used for both transmission and receiving purposes. A transmit/receive section 11 is a radio transmit/receive section for transmitting and receiving a radio signal to and from the receiving party. An outgoing call amplifier 12 amplifies an outgoing audio signal. An incoming call amplifier 13 amplifies an incoming audio signal. An electric capacitor microphone (ECM) 14 is used for sending a call, and a receiver 15 receives a call. A control section 17 serves as a primary control circuit for controlling the telephone set. The control section 17 comprises a protocol section 17a, an ADPCM codec section 17b, and a call acknowledgement detection section 17c. A light-emitting element section 18 is an LED or lamp used for drawing the caller's attention, and an LCD driver 19 drivers an LCD display device 20. The LCD display device 20 is a liquid crystal display for indicating various status information items. An audio output section 21 is a speaker for reporting a call acknowledgement to the calling party. A keyboard 22 is used for entering a telephone number, etc.

The operation of the telephone set according to the embodiment having the foregoing configuration will now be described by reference to the block diagram shown in FIG. 1 and a flowchart shown in FIG. 2.

Link Channel Establishment Request: When an off-hook operation is performed by way of the keyboard 22 of the telephone set of the calling party, the protocol section 17a of the control section 17 detects the off-hook operation signal and transmits a link channel establishment request signal by way of the radio transmit/receive section 11 and the antenna 10. (ST1)

Link Channel Assignment: The thus-transmitted request signal is received by an antenna 31 of a base station 30, and a link channel assignment signal is sent to the calling party. The link channel assignment signal is received by the antenna 10 and is input to the radio transmit/receive section 11, where the link channel assignment signal is demodulated. The thus-demodulated link channel assignment signal is output to the protocol section 17a of the control section 17. (ST2)

Synchronous burst signal, SABM, UA: A receiving synchronous burst signal is output from the antenna 10 of the calling party, and a transmission synchronous burst signal is output from the antenna 31 of the base station 30. (ST3 to ST8)

Call Setting, Call Setting Reception, Secrecy Key Setting, Authentication Setting, and Authentication Response: The calling party outputs signals in the sequence of Call Setting, Secrecy Key Setting, and Authentication Response, and the base station outputs signals in the sequence of Call Setting Reception and Authentication Request. (ST9 to ST13)

DISC, UA, Call (Y: if any), and Response: When the calling party outputs an authentication response signal to the base station, the call acknowledgement detection section 17c provided in the control section 17 of the calling party receives a call signal output from the base station. (ST14 to 17)

Specific Audio Output or Specific Screen Color Display: A specific audio signal, e.g., a "chime" is output from the audio output section 21. Alternatively, the control section 17 activates the LCD driver 19, thereby displaying a specific screen display on the LCD display device 20 and illuminating the light-emitting element 18 in a specific screen color. (ST18)

No Call (N), Two Repetitions of Automatic Call Origination Within Three Minutes (Y), Disconnection, Release, and Release Completion: In a case where the base station 30 outputs a busy tone signal in place of a call signal, when a disconnection/release signal is transmitted from the base station 30 to the calling party, the calling party transmits a release completion signal to the base station 30. (ST20 to ST23)

Two Repetitions of Automatic Call Origination Within Three Minutes (N) and Wait: If the number of repetitions of automatic call origination exceeds two within three minutes after the first call origination, the telephone set of the calling party enters a wait state. (ST24)

Radio Channel Disconnection and Completion of Radio Channel Disconnection: The base station 30 transmits a radio channel disconnection signal to the calling party, and the calling party sends a radio channel disconnection completion signal to the base station 30. (ST25 to ST26)

Link Channel Establishment Request: The calling party transmits a link channel establishment request signal after lapse of a specific period of time following transmission of the disconnection signal to the base station 30. The signals are transmitted in the same sequence as followed previously. At this time, if a call acknowledgement from the base station 30 is received, the call acknowledgement is input to the call acknowledgement detection section 17c provided in the control section 17 of the calling party in the same manner as described previously. Under control of the control section 17, the audio output section 21 outputs a specific audio signal. Alternatively, under control of the control section 17, the LCD driver 19 is activated to thereby display a specific screen display on the LCD display device 20 or to illuminate the light-emitting element 18 in a specific screen color.

If the base station 30 outputs a busy tone signal in lieu of the call signal, the calling party transmits a disconnection signal to the base station 30 and transmits a link channel establishment request signal after lapse of a specific period of time following transmission of the disconnection signal, in the same manner as described previously. The number of repetitions of automatic call origination is two or fewer within three minutes after the first call origination.

Although the present invention has been described with reference to a telephone set connected to a base station over a radio channel, as a portable telephone set, the technique relating to the present invention can also be applied to a cordless telephone set which is connected, by way of a radio channel, to a master telephone set connected to a station circuit over a wire telephone network, thereby yielding the same advantageous results.

As mentioned above, according to the present embodiment, a telephone set equipped with automatic call acknowledgement detection means is configured so as to receive a call acknowledgement signal, to identify whether or not a receiving party has output a call acknowledgement, to automatically originate a call after lapse of a predetermined period of time if no call acknowledgement from the receiving party is detected, and to report to the calling party whether or not the receiving party has output a call acknowledgement by use of a different acknowledgment sound or a different screen color. As a result, the calling party can readily ascertain whether or not the receiving party has output a call acknowledgement, thereby eliminating the necessity for manual redialing operations.

As is evident from the foregoing description, in the telephone set according to the present invention, when no call acknowledgement from the receiving party is received, the telephone set of the calling party reports to the calling party lack of call acknowledgement from the receiving party by use of a specific audio signal output or a specific screen color display. After lapse of a specific period of time, repetitions of call origination are performed through automatic call origination. If a call acknowledgement from the receiving party is detected, the telephone set of the calling party reports to the calling party the call acknowledgement from the receiving party, by use of an audio signal output or a screen display, both of which differ from those used in reporting lack of a call acknowledgement from the receiving party. Therefore, the calling party can readily identify the call acknowledgement from the receiving party without fail and establish a call. Consequently, there is yielded an advantage of a reduction in the number of repetitions of call origination performed by the calling party and an improvement in convenience and operability of the telephone set.

What is claimed is:

1. A telephone set connected to a base station over a radio channel, comprising:

a transmit/receive section for sending and receiving a signal to and from the base station; and a call acknowledgment detection section which detects a call acknowledgment signal sent by a receiving party telephone in response to a signal sent by the telephone set and without intervention by a receiving party, wherein the call acknowledgment signal indicates that the receiving party telephone has an ability to receive the call wherein the call acknowledgment display means comprises audio means which outputs a predetermined call acknowledgment sound signal when the call acknowledgement detection means detects the call acknowledgment signal from the receiving party telephone and which outputs a sound different from the predetermined call acknowledgment sound when the call acknowledgement signal is not detected.

2. The telephone set as defined in claim 1, further comprising:

an automatic call origination section which automatically re-originates the call after lapse of a predetermined period of time if the call acknowledgment detection section does not detect any call acknowledgment signal from the receiving party telephone; and call acknowledgment display means which displays whether or not the call acknowledgment detection section has detected the call acknowledgment signal from the receiving party telephone.

3. The telephone set as defined in claim 2, wherein the call acknowledgment display means comprises audio output means which outputs a predetermined call acknowledgment sound signal when the call acknowledgment detection means detects the call acknowledgment signal from the receiving party telephone and which outputs a sound different from the predetermined call acknowledgment sound when the call acknowledgment signal is not detected.

4. The telephone set as defined in claim 2, wherein the call acknowledgment display means comprises screen display means which indicates a predetermined screen color when the call acknowledgment detection section detects the call acknowledgment signal and which indicates a screen color different from the predetermined screen color when no call acknowledgment signal from the receiving party telephone is detected.

5. A cordless telephone set connected with a master telephone set by wireless manner, the cordless telephone comprising:

a transmit/receive section for sending and receiving a signal to and from the master telephone set;

a call acknowledgment detection section for detecting a call acknowledgment signal sent from the transmit/receive section of a receiving party telephone without intervention by a receiving party, wherein the call acknowledgment signal indicates whether a receiving party telephone has an ability to receive the call;

an automatic call origination section which automatically re-originates the call after lapse of a predetermined period of time if no call acknowledgment signal from the receiving party telephone is detected; and call acknowledgment display means for displaying whether or not the call acknowledgment detection section has detected the call acknowledgment signal from the receiving party telephone wherein the call acknowledgment display means comprises audio means which outputs a predetermined call acknowledgment sound signal when the call acknowledgement detection means detects the call acknowledgment signal from the receiving party telephone and which outputs a sound different from the predetermined call acknowledgment sound when the call acknowledgement signal is not detected.

6. The telephone set as defined in claim 5, wherein the call acknowledgment display means comprises audio output means which outputs a predetermined call acknowledgment sound signal when the call acknowledgment detection means detects the call acknowledgment signal from the receiving party telephone and which outputs a sound different from the predetermined call acknowledgment sound when the call acknowledgment signal is not detected.

7. The telephone set as defined in claim 5, wherein the call acknowledgment display means comprises screen display means which indicates a predetermined screen color when the call acknowledgment detection section detects the call acknowledgment signal and which indicates a screen color different from the predetermined screen color when no call acknowledgment signal from the receiving party telephone is detected.

8. A telephone set comprising:

a transmit/receive section for originating a call to a receiving party telephone;

a call acknowledgment detection section for checking whether the receiving party telephone has output a call acknowledgment signal;

notification means for notifying a calling party whether a call acknowledgment signal has been received; and an automatic call originating section that automatically performs a call originating operation after a lapse of a specified period if a call acknowledgment signal has not been received wherein the call acknowledgment display means comprises audio means which outputs a predetermined call acknowledgment sound signal when the call acknowledgement detection means detects the call acknowledgment signal from the receiving party telephone and which outputs a sound different from the predetermined call acknowledgment sound when the call acknowledgement signal is not detected.

9. The telephone set as defined in claim 8, wherein the automatic call originating section automatically initiates the call originating operation if the call acknowledgement signal has not been received.

10. A telephone set connected to a base station over a radio channel, the telephone set comprising:

a transmit/receive section for sending and receiving a signal to and from the base station;

a call acknowledgment detection section which detects a call acknowledgment signal sent by a receiving party telephone before the receiving party telephone receives a call, wherein the call acknowledgment signal indicates that the receiving party telephone has an ability to receive the call; and an automatic call origination section which automatically re-originates the call after lapse of a predetermined period of time if the call acknowledgment detection section does not detect any call acknowledgment signal from the receiving party telephone wherein the call acknowledgment display means comprises audio means which outputs a predetermined call acknowledgment sound signal when the call acknowledgment detection means detects the call acknowledgment signal from the receiving party telephone and which outputs a sound different from the predetermined call acknowledgment sound when the call acknowledgement signal is not detected.

11. The telephone set as defined in claim 10, further comprising:

call acknowledgment display means which displays whether or not the call acknowledgment detection section has detected the call acknowledgment signal from the receiving party telephone.

12. The telephone set as defined in claim 11, wherein the can acknowledgment display means comprises audio output means which outputs a predetermined call acknowledgment sound signal when the call acknowledgment detection means detects the call acknowledgment signal from the receiving party telephone and which outputs a sound different from the predetermined call acknowledgment sound when the call acknowledgment signal is not detected.

13. The telephone set as defined in claim 11, wherein the call acknowledgment display means comprises screen display means which indicates a predetermined screen color when the call acknowledgment detection section detects the call acknowledgment signal and which indicates a screen color different from the predetermined screen color when no call acknowledgment signal from the receiving party telephone is detected.

14. A cordless telephone set connected with a master telephone set by wireless manner, the cordless telephone comprising:

a transmit/receive section for sending and receiving a signal to and from the master telephone set;

a call acknowledgment detection section for detecting a call acknowledgment signal sent by a transmit/receive section of a receiving party telephone before the receiving party telephone receives a call, wherein the call acknowledgment signal indicates whether the receiving party telephone has an ability to receive the call;

an automatic call origination section which automatically re-originates the call after lapse of a predetermined period of time if no call acknowledgment signal from the receiving party telephone is detected; and call acknowledgment display means for displaying whether or not the call acknowledgment detection section has detected the call acknowledgment signal from the receiving party telephone wherein the call acknowledgment display means comprises audio means which outputs a predetermined call acknowledgment sound signal when the call acknowledgement detection means detects the call acknowledgment signal from the receiving party telephone and which outputs a sound different from the predetermined call acknowledgment sound when the call acknowledgment signal is not detected.

15. The telephone set as defined in claim 14, wherein the call acknowledgment display means comprises screen display means which indicates a predetermined screen color when the call acknowledgment detection section detects the call acknowledgment signal and which indicates a screen color different from the predetermined screen color when no call acknowledgment signal from the receiving party telephone is detected.

16. A telephone set comprising:
a transmit/receive section for originating a call to a receiving party telephone;
a call acknowledgment detection section for checking whether the receiving party telephone has output a call acknowledgment signal before the call to the receiving party telephone is originated;
notification means for notifying a calling party whether a call acknowledgment signal has been received; and
an automatic call originating section that automatically performs a call originating operation after a lapse of a specified period if a call acknowledgment signal has not been received wherein the call acknowledgment display means comprises audio means which outputs a predetermined call acknowledgment sound signal when the call acknowledgement detection means detects the call acknowledgment signal from the receiving party telephone and which outputs a sound different from the predetermined call acknowledgment sound when the call acknowledgement signal is not detected.

17. The telephone set as defined in claim 16, wherein the automatic call originating section automatically initiates the call originating operation if the call acknowledgment signal has not been received.

18. A telephone set connected to a base station over a radio channel, comprising:
a transmit/receive section for sending and receiving a signal to and from the base station;
a call acknowledgment detection section which detects a call acknowledgment signal sent by a receiving party telephone without intervention by a receiving party, wherein the call acknowledgment signal indicates that the receiving party telephone has an ability to receive the call;
an automatic call origination section which automatically re-originates the call after lapse of a predetermined period of time if the call acknowledgment detection section does not detect any call acknowledgment signal from the receiving party telephone; and call acknowledgment display means which displays whether or not the call acknowledgment detection section has detected the call acknowledgment signal from the receiving party telephone, wherein the call acknowledgment display means comprises screen display means which indicates a predetermined screen color when the call acknowledgment detection section detects the call acknowledgment signal and which indicates a screen color different from the predetermined screen color when no call acknowledgment signal from the receiving party telephone is detected.

19. A cordless telephone set connected with a master telephone set by wireless manner, the cordless telephone comprising:
a transmit/receive section for sending and receiving a signal to and from the master telephone set;
a call acknowledgment detection section for detecting a call acknowledgment signal sent from the transmit/receive section of a receiving party telephone without intervention by a receiving party, wherein the call acknowledgment signal indicates whether a receiving party telephone has an ability to receive the call;
an automatic call origination section which automatically re-originates the call after lapse of a predetermined period of time if no call acknowledgment signal from the receiving party telephone is detected; and
call acknowledgment display means for displaying whether or not the call acknowledgment detection section has detected the call acknowledgment signal from the receiving party telephone,
wherein the call acknowledgment display means comprises screen display means which indicates a predetermined screen color when the call acknowledgment detection section detects the call acknowledgment signal and which indicates a screen color different from the predetermined screen color when no call acknowledgment signal from the receiving party telephone is detected.

20. A telephone set connected to a base station over a radio channel, the telephone set comprising:
a transmit/receive section for sending and receiving a signal to and from the base station;
a call acknowledgment detection section which detects a call acknowledgment signal sent by a receiving party telephone before the receiving party telephone receives a call, wherein the call acknowledgment signal indicates that the receiving party telephone has an ability to receive the call;
an automatic call origination section which automatically re-originates the call after lapse of a predetermined period of time if the call acknowledgment detection section does not detect any call acknowledgment signal from the receiving party telephone; and
call acknowledgment display means which displays whether or not the call acknowledgment detection section has detected the call acknowledgment signal from the receiving party telephone,
wherein the call acknowledgment display means comprises screen display means which indicates a predetermined screen color when the call acknowledgment detection section detects the call acknowledgment signal and which indicates a screen color different from the predetermined screen color when no call acknowledgment signal from the receiving party telephone is detected.

21. A cordless telephone set connected with a master telephone set by wireless manner, the cordless telephone comprising:

a transmit/receive section for sending and receiving a signal to and from the master telephone set;

a call acknowledgment detection section for detecting a call acknowledgment signal sent by a transmit/receive section of a receiving party telephone before the receiving party telephone receives a call, wherein the call acknowledgment signal indicates whether the receiving party telephone has an ability to receive the call;

an automatic call origination section which automatically re-originates the call after lapse of a predetermined period of time if no call acknowledgment signal from the receiving party telephone is detected; and call acknowledgment display means for displaying whether or not the call acknowledgment detection section has detected the call acknowledgment signal from the receiving party telephone, wherein the call acknowledgment display means comprises screen display means which indicates a predetermined screen color when the call acknowledgment detection section detects the call acknowledgment signal and which indicates a screen color different from the predetermined screen color when no call acknowledgment signal from the receiving party telephone is detected.

* * * * *